United States Patent [19]
Otsu

[11] Patent Number: 5,992,035
[45] Date of Patent: Nov. 30, 1999

[54] ORNAMENTAL CUTTING/SERVING MEASURING BOARD

[75] Inventor: Yoshiji Otsu, Owariasahi, Japan

[73] Assignee: Meiko Toki Co., Ltd., Japan

[21] Appl. No.: 08/955,950

[22] Filed: Oct. 22, 1997

[30] Foreign Application Priority Data

Apr. 7, 1997 [JP] Japan ................................ 7-032503

[51] Int. Cl.⁶ .................................................. G01B 3/34
[52] U.S. Cl. ................................ 33/524; 33/1 F; 33/555.2
[58] Field of Search ............................ 33/524, 525, 1 F, 33/501.45, 555.2

[56] References Cited

U.S. PATENT DOCUMENTS 3,874,085  4/1975  Atkins .................................... 33/524
4,333,241  6/1982  Wasik et al. ............................ 33/755

FOREIGN PATENT DOCUMENTS 47-5277  2/1972  Japan .
6-55540  8/1994  Japan .

*Primary Examiner*—Christopher W. Fulton
*Attorney, Agent, or Firm*—Parkhurst & Wendel, L.L.P.

[57] ABSTRACT

An ornamental cutting/serving measuring board usable as various kitchen utensils, such as a cheese cutting board, a teapot board, a noodle gauge, a standing party tray and the like, a surface of a ceramic board body is coated with an ornamental glaze layer. A hanger portion is formed in an upper portion of the ceramic board body. The ceramic board body has a plurality of through-holes of different sizes. A hole edge of each through-hole is covered with the ornamental glaze layer for comfort and safety.

1 Claim, 2 Drawing Sheets

ORNAMENTAL CUTTING/SERVING MEASURING BOARD

BACKGROUND OF THE INVENTION

1. Field of the Invention

The present invention relates to a versatile ornamental board usable as various kitchen utensils, which not only decorates a kitchen but also serves as various kitchen utensils, such as a cheese cutting board, a teapot board, a noodle gauge, a standing party tray and the like.

2. Description of the Related Art

There is a known ornamental board wherein a ceramic body is coated with an ornamental glaze layer and has a hanging member provided in an upper portion of the board. The conventional ornamental board is designed for use as not only an ornament in a kitchen but also a cheese cutting board or a teapot board. However, the use of this ornamental board as a kitchen utensil is limited only to the use as a cheese cutting board or a teapot board. Therefore, the ornamental board is not widely used.

SUMMARY OF THE INVENTION

Accordingly, it is an object of the present invention to provide a more convenient versatile ornamental board usable as various kitchen utensils, which has an increased number of kitchen utensil functions.

According to the present invention, there is provided a versatile ornamental board usable as various kitchen utensils, including a ceramic board body whose surface is coated with an ornamental glaze layer, a hanger portion formed in an upper portion of the ceramic board body, and a plurality of through-holes of different sizes formed in the ceramic board body. An edge portion of each through-hole is covered with the ornamental glaze layer.

The versatile ornamental board usable as various kitchen utensils of the present invention is normally hung on a kitchen wall using the hanger portion provided in an upper portion of the ceramic board body, so that the ornamental glaze layer on the obverse surface produces an interior ornamental effect.

The versatile ornamental board can easily be taken off the wall for use as a kitchen utensil such as a cheese cutting board, teapot board or the like. Since the ornamental glaze layer is formed on the ceramic board body, the surface hardness of the versatile ornamental board is high so that contact with a cutter blade or a teapot bottom will not form a scratch on the surface. Further, the ceramic-made versatile ornamental board is easy to wash. These advantages are substantially the same as achieved also by the conventional art.

Moreover, the versatile ornamental board of the present invention has a plurality of through-holes of different sizes formed in the ceramic board body, and the ornamental glaze layer covers edges of the through-holes to form smooth hole-defining surfaces, thereby making the versatile ornamental board usable also as a noodle gauge or a standing party tray. More specifically, a predetermined amount of dry noodles or dry spaghetti is passed through a suitable one of the through-holes of different sizes to measure an amount for a predetermined number of persons. For a standing party, the versatile ornamental board can be held in a horizontal posture by inserting a finger or a thumb into any of the through-holes as in a manner for holding a painting pallet, so that the surface of the ceramic board body can be used as a hand plate for the person's portion or the like.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

Figure 1:
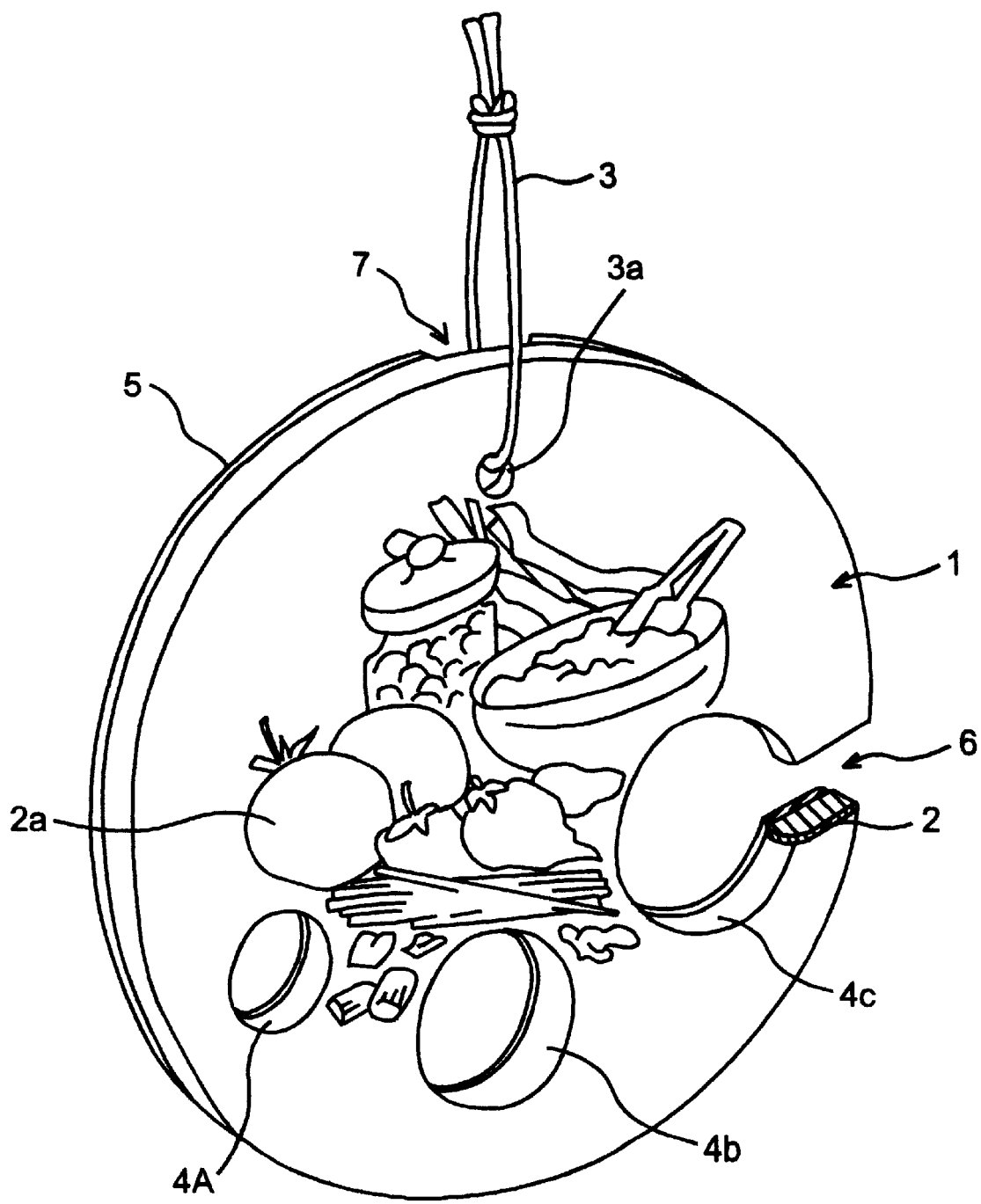
FIG. 1 is a partially cut-away perspective view of an embodiment of the present invention.

A preferred embodiment of the present invention will be described in detail hereinafter with reference to the perspective view of FIG. 1 and the sectional view of FIG. 2.

A disc-shaped ceramic board body 1 has a diameter of 150–200 mm and a thickness of about 5 mm. A surface of the ceramic board body 1 is coated with an ornamental glaze layer 2 having a decorative portion 2a. A small hole 3a is formed in an upper portion of the ceramic board body 1, forming a hanger portion according to the present invention. According to this embodiment, a line-like hanging member 3, such as a leather strip, is passed through the small hole 3a, and the two ends thereof are tied together. A portion extending on a reverse side of the ceramic board body 1 from the small hole 3a to a peripheral edge of the ceramic board body 1 is grooved to form a receptable portion 7 for receiving the line-like hanging member 3 passed through the small hole 3a. A plurality of through-holes 4a, 4b, 4c of different sizes are formed in the ceramic board body 1.

In addition, the area of an opening of the smallest through-holes 4a is about the size that allows a bundle of dry spaghetti threads for one person to be passed through, and the area of an opening the intermediate-size through-hole 4b is about the size that allows a bundle of dry spaghetti for two persons to be passed through, and the area of an opening of the largest through-hole 4c is about the size that allows a bundle of dry spaghetti for three persons to be passed through. That is, the areas of the openings of the through-holes 4a, 4b, 4c are determined such that if the area of the opening of the smallest through-hole is defined as 1, the areas of the openings of the through-holes 4b, 4c become equivalent to multiples larger than 1, for example, 2, 2.5 and 3, thereby forming convenient devices for measuring dry noodles and the like. Each of the through-holes 4a, 4b, 4c is made larger in diameter at an obverse side than at a reverse side, and a hole edge of each through-hole is rounded to form an introductive edge, thereby facilitating insertion of dry noodles or the like and eliminating uneasy touch or possible scraping that might otherwise occur when a finger or thumb is inserted.

Figure 2:
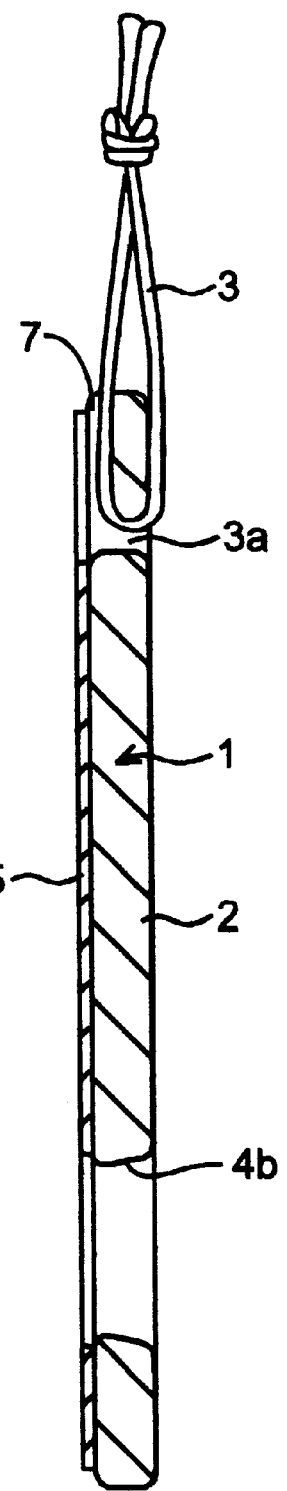
FIG. 2 is a sectional view of the embodiment shown in FIG. 1.

In the partially cutaway perspective view of FIG. 1, a portion 6 extending from an end of the through-hole to a peripheral edge of the ceramic board body 1 is cut away to illustrate a section near the through-hole 4c. As shown in FIGS. 1 and 2, a damper plate 5 formed of a cork plate or the like is adhered to the reverse surface of the ceramic board body 1.

The damper plate 5 covers substantially the entire reverse surface of the ceramic board body 1 except the through-holes 4a, 4b, 4c, the small hole 3a and the receptacle portion 7 for the line-like hanging member 3 passed through the small hole 3a, to substantially prevent breakage of the ceramic board body 1 or production of loud noises when the reverse surface of the ceramic board body 1 contacts or strikes a wall surface, a table surface or the like.

The thus-constructed versatile ornamental board of this embodiment is normally hung on a wall surface of a kitchen or the like, using the hanging member 3 disposed on an upper portion of the ceramic board body 1, thereby producing an interior ornamental effect. When taken off the wall surface or the like, the board can be used as a versatile kitchen utensil as follows.

For use as a cheese cutting board, the ceramic board body 1 is placed on a table or the like with the damper plate 5 facing down to provide damping or cushioning. A cake of cheese is then placed and cut on the surface of the ceramic board body 1 coated with the ornamental glaze layer 2.

For use as a teapot board, the ceramic board body 1 is also placed on a table or the like with the damper plate 5 facing down to provide damping or cushioning, and a teapot is placed on the surface of the ceramic board body 1 coated with the ornamental glaze layer 2. Since the surface hardness of the ceramic board body 1 coated with the ornamental glaze layer 2 is high, contact with a cutter blade or a teapot does not form a scratch on the surface.

Furthermore, the ceramic board body 1 is easy to wash. Thus, the ornamental board can conveniently be used as a kitchen utensil, as in a conventional ornamental board of a similar kind.

If the versatile ornamental board of this embodiment is needed for use as a noodle gauge, the ceramic board body 1 is taken off the wall surface of the like and held by a hand. Then, an end of a bundle of dry noodles is placed close to one of the through-holes 4a, 4b, 4c that corresponds to an amount needed for the number of persons concerned, and a predetermined amount of dry noodles is passed through the hole, thereby measuring out an amount of dry noodles needed for the particular number of persons with relative ease. If it is desired for use as a standing party tray, the ceramic board body 1 is taken off the wall surface of the like and held horizontally in a manner for holding a painting pallet by inserting a thumb or a finger or fingers into any of the through-holes 4a, 4b, 4c, so that the beautiful surface of the ceramic board body 1 coated with the ornamental glaze layer 2 can be used as a hand plate.

Since the areas of the openings of the through-holes 4a, 4b, 4c are determined such that if the area of the opening of the smallest through-hole 4a is defined as 1, the areas of the openings of the through-holes 4b, 4c become equivalent to multiples greater than 1, the versatile ornamental board is convenient for measuring dry noodles or the like.

Further, since each of the through-holes 4a, 4b, 4c is made larger in diameter at the obverse side than at the reverse side and a hole edge of each through-hole is rounded to form an introductive edge, this embodiment makes a convenient ornamental board that facilitates insertion of dry noodles or the like and eliminates uneasy touch which would otherwise be felt when a finger or thumb is inserted.

The small hole 3a may be formed as a noodle-measuring through-hole similar to the through-holes 4a, 4b, 4c, by providing a suitable area of the hole opening.

As understood from the above description, in the versatile ornamental board usable as various kitchen utensils of the present invention, a surface of the ceramic board body is coated with an ornamental glaze layer and a hanger portion is formed in an upper portion of the ceramic board body. The ceramic board body has a plurality of through-holes of different sizes, and hole edges are covered with the ornamental glaze layer. Therefore, besides an ornamental effect, the versatile ornamental board performs functions of various kitchen utensils, such as a cheese cutting board, a teapot board, a noodle gauge, a standing party tray and the like.

Thus, the present invention provides a useful versatile ornamental board having an increased number of kitchen utensil functions, compared with a conventional ornamental board usable as a kitchen utensil.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements included within the spirit and scope of the appended claims.

What is claimed is:

1. An ornament cutting/serving measuring board usable as various kitchen utensils, comprising:

a ceramic board body whose surface is coated with an ornamental glaze layer;

a hanger portion formed in an upper portion of the ceramic board body;

said ceramic board having a plurality of through-holes of different sizes formed in the ceramic board body, and an edge portion of each through-hole being covered with the ornamental glaze layer, wherein each through-hole is larger in diameter at a front side than at a rear side, and a hole edge of each through-hole is tapered to form an introductive edge.

* * * * *

UNITED STATES PATENT AND TRADEMARK OFFICE
CERTIFICATE OF CORRECTION

PATENT NO. : 5,992,035
DATED : November 30, 1999
INVENTOR(S) : Yoshiji OTSU

It is certified that error appears in the above-identified patent and that said Letters Patent is hereby corrected as shown below:

On the title page, Item [30] Foreign Application Priority Data, change "7-032503" to --7-82503--.

Signed and Sealed this

Sixteenth Day of May, 2000

Attest:

Q. TODD DICKINSON

*Attesting Officer*     *Director of Patents and Trademarks*